United States Patent [19]

Ferran

[11] Patent Number: 5,396,803
[45] Date of Patent: Mar. 14, 1995

[54] DUAL BALANCED CAPACITANCE MANOMETERS FOR SUPPRESSING VIBRATION EFFECTS

[75] Inventor: Robert J. Ferran, San Diego, Calif.

[73] Assignee: Tylan General, Inc., San Diego, Calif.

[21] Appl. No.: 88,317

[22] Filed: Jul. 7, 1993

[51] Int. Cl.[6] .............................................. G01L 9/12
[52] U.S. Cl. ...................................... 73/724; 73/718
[58] Field of Search ................. 73/718, 724, 728, 722; 361/283

[56] References Cited

U.S. PATENT DOCUMENTS

| | | | |
|---|---|---|---|
| 2,829,520 | 4/1958 | Stanton | 73/718 |
| 3,747,042 | 7/1973 | Sheldon | 73/722 |
| 3,783,693 | 1/1974 | Paros | 73/724 |
| 3,965,746 | 6/1976 | Rabek | 73/718 |
| 4,262,540 | 4/1981 | Tamai et al. | 73/718 |
| 4,398,194 | 8/1983 | Johnston | 340/870.37 |
| 4,691,574 | 9/1987 | Delatorre | 73/708 |
| 4,823,603 | 4/1989 | Ferran et al. | 73/724 |
| 4,864,463 | 9/1989 | Shkedi et al. | 361/283 |
| 4,974,117 | 11/1990 | Irwin | 361/283 |

*Primary Examiner*—Richard F. Chilcot, Jr.
*Assistant Examiner*—William L. Oen
*Attorney, Agent, or Firm*—Knobbe, Martens Olson & Bear

[57] ABSTRACT

A sensor measures an unknown pressure having to a sensitivity on the order of 1 micro-torr. The sensor includes two 10 micro-torr sensitivity capacitance manometers which each receive the unknown pressure. The capacitance manometers are positioned about a common axis around a common pressure chamber that receives the unknown pressure so that the flexible diaphragms of each of the capacitance manometers simultaneously deform either outwardly or inwardly from the common pressure chamber in response to changes in pressure. When a vibrational or gravitational force is applied to the sensor, one flexible diaphragm deforms outwardly away from the common pressure chamber and the other deforms inwardly towards the common pressure chamber. Hence, changes in pressure cause each of the capacitance manometers to produce a like change in their output signal; however, vibrational or gravitational forces produce an opposite change in their output signal. The capacitance manometers are also connected to an electrical circuit which nulls any changes resulting from vibration or gravity, and the electrical circuit is tuneable to account for any variations in the changes due to gravitational forces produced by the capacitance manometers.

29 Claims, 10 Drawing Sheets

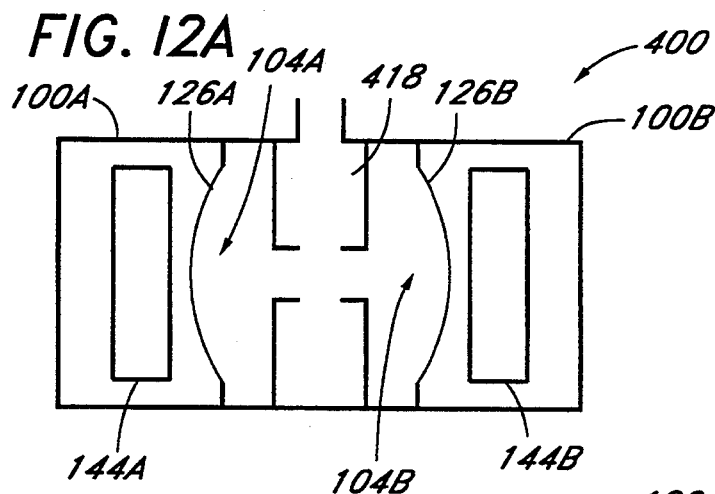
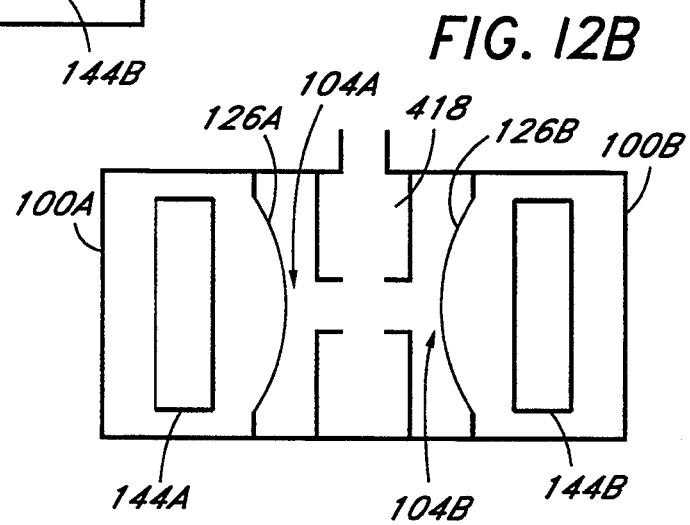
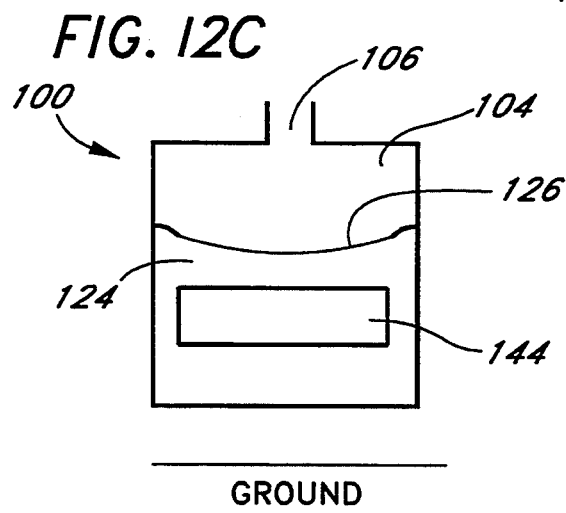
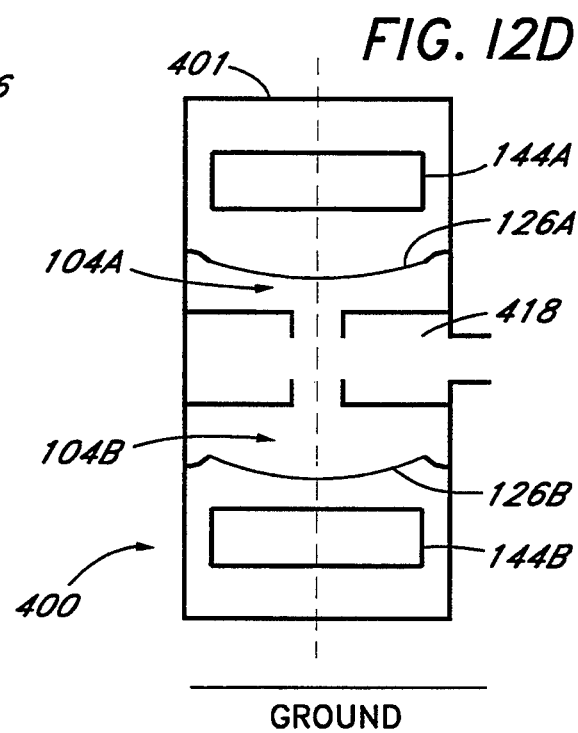

DUAL BALANCED CAPACITANCE MANOMETERS FOR SUPPRESSING VIBRATION EFFECTS

BACKGROUND OF THE INVENTION

1. Field of the Invention

The present invention generally relates to measuring pressure within an enclosed space by using a capacitance diaphragm gauge and, more particularly, is concerned with a highly sensitive capacitance diaphragm gauge which is configured to minimize inaccuracy in measurements resulting from mechanical vibrations and other effects of external forces applied to the gauge.

2. Description of the Prior Art

In a system having liquids or gasses that must be maintained within a predetermined pressure range, it is necessary to accurately measure the pressure. Presently, numerous devices are available to measure pressure. Some of these devices indicate pressure while others act as transducers by converting the measured pressure to a calibrated quantity to be transmitted to another system. For example, in a system which utilizes electronic circuits to automatically control the pressure, it is desirable to provide an electrical representation of the pressure that can be provided as an input to the electronic circuitry. One such device that is used to generate an electrical representation of the pressure is a capacitance manometer, or capacitance diaphragm gauge.

An exemplary capacitance manometer is described in U.S. Pat No. 3,557,621, issued on Jan. 26, 1971. Briefly, such a capacitance manometer has a diaphragm comprising an electrically conductive material that is supported along the periphery of the diaphragm by a housing or other such support structure. Typically, the housing is constructed from an electrically conductive metal so that the housing provides an electrically conductive path to the diaphragm. The diaphragm, which functions as one electrode of a capacitor, is positioned proximate to at least one reference electrode, which, as described in U.S. Pat. No. 3,557,621, is preferably fixed. For example, the fixed reference electrode is advantageously mounted on a ceramic disc substrate which is itself mounted to the housing.

One side of the diaphragm is exposed to a known or reference pressure and the other side of the diaphragm is exposed to an unknown, variable pressure that is to be measured. A differential in the pressure between the two sides of the diaphragm cause the center of the diaphragm to move in the direction of the lower of the two pressures and thus causes the diaphragm to develop a curvature. Such movement and resulting curvature causes the center of the diaphragm to move closer to or further from the fixed reference electrode of the capacitor and thus causes a corresponding change in the capacitance between the two electrodes. The capacitance between the two electrodes can be monitored, for example, by the circuit shown in FIG. 2 of U.S. Pat. No. 3,557,621, to thereby detect the movement of the diaphragm and thus detect changes in the pressure. The electrical output signal of the circuit can be measured by known devices and calculations performed on the measured signal value to provide an indication of the pressure differential.

As used herein, the full scale range of a capacitance manometer is the maximum pressure differential that the capacitance manometer can measure. Capacitance manometers of the type described above typically had a full scale range on the order of 1 torr. The sensitivity of a capacitance manometer is the smallest amount of pressure differential that can be measured by a capacitance manometer. Typically, the theoretical sensitivity of a capacitance manometer is a small fraction of the full scale pressure range. For example, the more recently developed capacitance manometers have sensitivities in the range of $10^{-6}$ or $10^{-7}$ the full scale range of the manometer. For example, a capacitance manometer having a full scale range of 1 torr theoretically could have a sensitivity of 0.1-1 micro-torr (1 micro-torr equals $1 \times 10^{-6}$ torr). However, as discussed below, it has not been believed possible to achieve such sensitivity.

One problem which has previously prevented producing capacitance manometers with sensitivities in the theoretical range is that changes in the ambient temperature results in thermal expansion or contraction of the components used in the capacitance manometer. Specifically, the base supporting the fixed reference electrode is typically made of ceramic whereas the housing of the manometer by which the diaphragm, or variable reference electrode is supported, is typically made of metal. The metal and the ceramic have different thermal coefficients of expansion and contraction, consequently, they expand and contract to a different extent due to changes in the ambient temperature. This expansion and contraction of the housing and ceramic base often results in bending and curvature of the ceramic base forming the fixed reference electrode. Consequently, the capacitance measured by the manometer changes as a result of bending of the ceramic base. The changed capacitance is indistinguishable from a change in capacitance resulting from a change in pressure.

One solution to this problem was disclosed in U.S. Pat. No. 4,823,603, issued Apr. 25, 1989. This patent discloses using a roller bearing structure positioned between the housing and the ceramic base to minimize bending of the ceramic base and thereby minimize any changes in the capacitance read by the manometer resulting from thermal expansion and contraction of the components forming the manometer. Use of this roller bearing structure has allowed manufacturing of capacitance manometers having a full scale range on the order of 100 milli-torr, and having a corresponding potential sensitivity in the range of 0.01-0.1 micro-Torr; however, for reasons discussed below, the practical sensitivity under non-ideal operating conditions is around 10 micro-torr and does not come close to the potential sensitivity.

However, in some fields, such as semiconductor etching and manufacturing, there is a need for a pressure sensor which can detect changes of pressure on the order of 1 micro-torr or have sensitivities of approximately an order of magnitude greater than what is currently available. Unfortunately, pressure sensitivities in a range less than 10 micro-torr heretofore have been unattainable.

One reason which has precluded prior art capacitance manometers from having better than 10 micro-torr sensitivity is that the force exerted against the diaphragm resulting from the earth's gravitation or from inertial forces caused by vibration can, in some cases, approximate the force that the diaphragm would experience when subjected to a 10 milli-torr pressure differential, for example. Thus, such forces can cause the diaphragm to deflect sufficiently for the capacitance manometer to signal a pressure change when there was, in fact, no pressure change. Thus, although the manometer has a much better potential sensitivity, the ability to sense very small pressure differentials in the range of 1 micro-torr to 10 micro-torr is obscured by the effects of gravity or vibration.

A constant gravitational force on diaphragm does not by itself result in any inaccurate or false readings by the capacitance manometer because it produces a constant amount of deflection of the diaphragm and a constant capacitance reading which can be removed by calibration of the manometer. Consequently, the sensitivity of a stationary capacitance manometer to incremental changes in pressure is not usually affected by constant gravitational force. However, when vibrational forces are transmitted to the capacitance manometer or when the capacitance manometer is temporarily reoriented, the diaphragm deflects in the same manner that it would deflect as a result of a pressure differential. These vibrational forces can readily exceed 1 micro-torr, and, depending on the direction in which the vibrational forces are applied with respect to the diaphragm, may be as great as 10 milli-torr, or higher. Vibrational forces, for example, can be transmitted to the capacitance manometer as a result of the innumerable causes of vibration of the surface on which the capacitance manometer is mounted. For example, an individual walking by and bumping or brushing the structure on which the capacitance manometer is mounted, can result in false signals from the capacitance manometer. Further, vibrational forces sufficient to induce a false signal by the capacitance manometer can even be created by a large truck driving by on the street and shaking the building in which the capacitance manometer is being used.

Heretofore, there has not been any way to distinguish between the signals generated by the capacitance manometer as a result of changes in pressure less than 10 micro-torr and the signals generated by the capacitance manometer resulting from vibration induced non-constant gravitational forces. Consequently, prior art capacitance manometers of the type described generally do not have a pressure sensitivity in a range of less than 10 micro-torr.

A need therefore exists in the prior art for a device for sensing pressure differences having a sensitivity on the order of 1 micro-torr. Hence, a need further exists for a capacitance manometer based sensor capable of distinguishing between pressure differentials on the order of 1 micro-torr and vibrationally induced inertial forces or gravitational forces acting on the diaphragm of the capacitance manometer.

SUMMARY OF THE INVENTION

The aforementioned needs are satisfied by the present invention comprising an inertial and gravitational force insensitive pressure measuring sensor which includes a common pressure source, first and second flexible members, and a first and second fixed members. The first and second flexible members move in response to changes in an unknown pressure provided by the common pressure source and the first and second flexible members are respectively positioned relative to the first and second fixed members so that they form first and second sensors, each of which produces a signal indicative of the unknown pressure as indicated by movement of the first and second flexible member.

The first and second flexible member are also respectively positioned relative to the first and second fixed member such that a change in inertial or gravitational force which causes the first member and the second member to move in the same direction causes the first member to move in a first direction with respect to the first fixed member and causes the second flexible member to move in a second direction with respect to the second fixed member. In other words, when the gravitational force causes one of the flexible members to move towards its respective fixed member the gravitational force causes the other flexible member to move away from its respective fixed member. These movements respectively result in a first change in the signal produced by the first sensor and a second change in the signal produced by the second sensor. The signal changes offset each other so that the effect of the gravitational force is effectively nulled.

The present invention preferably includes an electrical circuit that receives the signals from the first and second sensors. The circuit is configured to produce a pressure signal indicative of the unknown pressure. The electrical circuit can be further configured so that the pressure signal produced is unaffected by any changes caused by inertial or gravitational force. Still further, the electrical circuit preferably includes an adjustable component which permits the sensor to be trimmed, i.e., adjusted prior to use, so that the output of the circuit is unaffected by inertial or gravitational forces.

In a further aspect of the present invention, the sensor comprises a first capacitance manometer and a second capacitance manometer which receive the same pressure to be measured. The first and second capacitance manometers produce respective signals indicative of the unknown pressure. Further, the first and second capacitance manometers are positioned relative to each other so that the change in force (e.g., caused by vibration or reorientation of the manometer) to the sensor results in a first change to the signal produced by the first capacitance manometer and a second change to the signal produced by the second capacitance manometer, where the first change is opposite the second change. Each of the capacitance manometers is connected to an electrical circuit which produces a pressure signal indicative of the unknown pressure that is unaffected by the first and second changes.

These and other objects and features of the present invention will become more fully apparent from the following description and the appended claims taken in conjunction with the accompanying drawings.

BRIEF DESCRIPTION OF THE DRAWINGS

FIGS. 12A and 12B are schematic diagrams illustrating the physical operation of the sensor of FIG. 11 in response to different unknown pressures.

FIG. 12C is a schematic diagram illustrating the operation of a prior art capacitance manometer, like the manometer shown in FIG. 1, in response to a vibrationally or gravitationally induced change in force applied to the manometer.

FIG. 12D is a schematic diagram illustrating the operation of the sensor of the present invention in response to the same change in force applied to the prior art capacitance manometer illustrated in FIG. 12C.

DETAILED DESCRIPTION OF THE PREFERRED EMBODIMENT

Reference is now made to the drawings wherein like numerals refer to like parts throughout. In order to better understand the problems solved by the present invention, the structure and operation of an exemplary known capacitance manometer will first be described in reference to FIGS. 1–9. Subsequently, the structure and operation of an embodiment of the pressure sensor of the present invention which incorporates two prior art capacitance manometers will be described in reference to FIGS. 10–14.

DESCRIPTION OF A PRIOR ART CAPACITANCE MANOMETER

Figure 2:
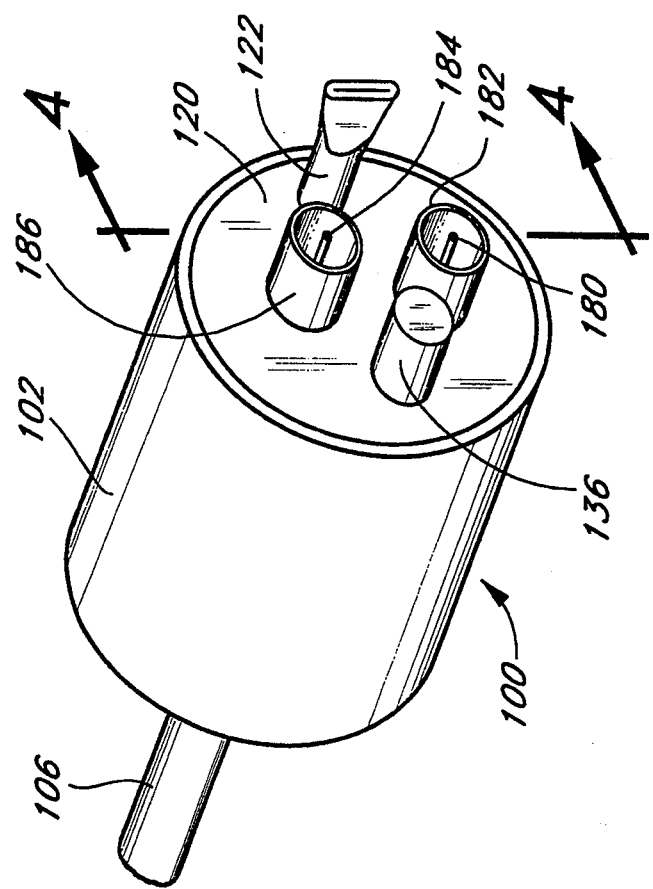
FIG. 2 is a perspective view of the assembled capacitance manometer of FIG. 1 showing the second end of the manometer with the two coaxial connectors, the getter enclosure and the pinched-off evacuation tube.
Figure 1:
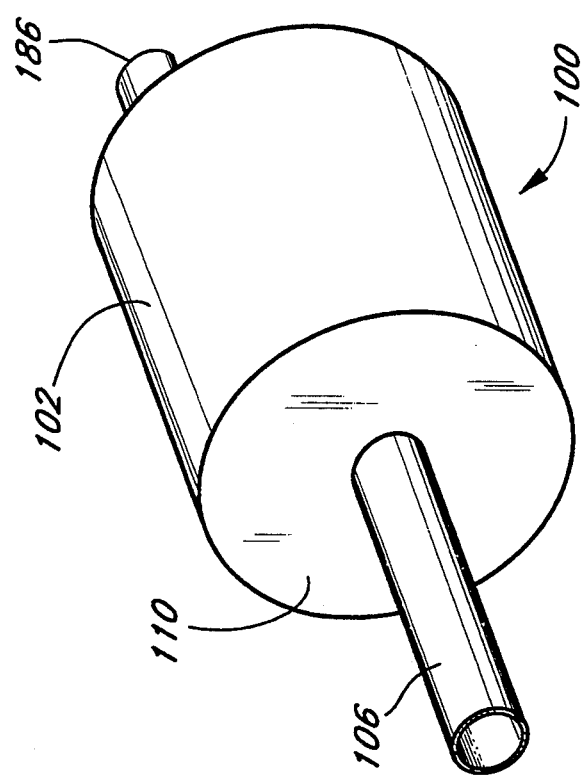
FIG. 1 is a perspective view of an assembled capacitance manometer in accordance with the prior art showing the outer shell and hollow pressure tube for connecting the manometer to a source of pressure.
Figure 3:
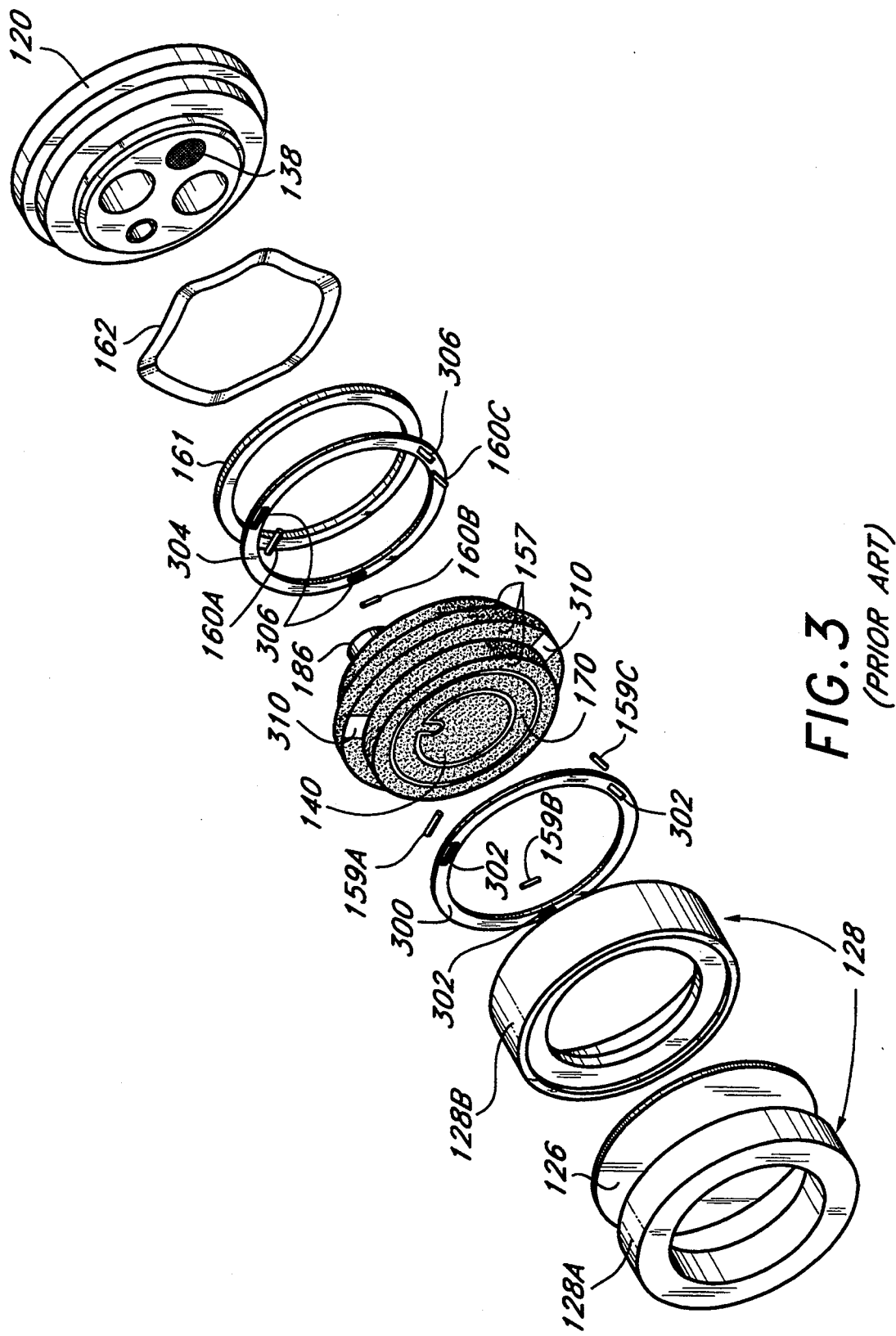
FIG. 3 is an exploded view of the capacitance manometer showing the internal structure of the capacitance manometer.
Figure 4:
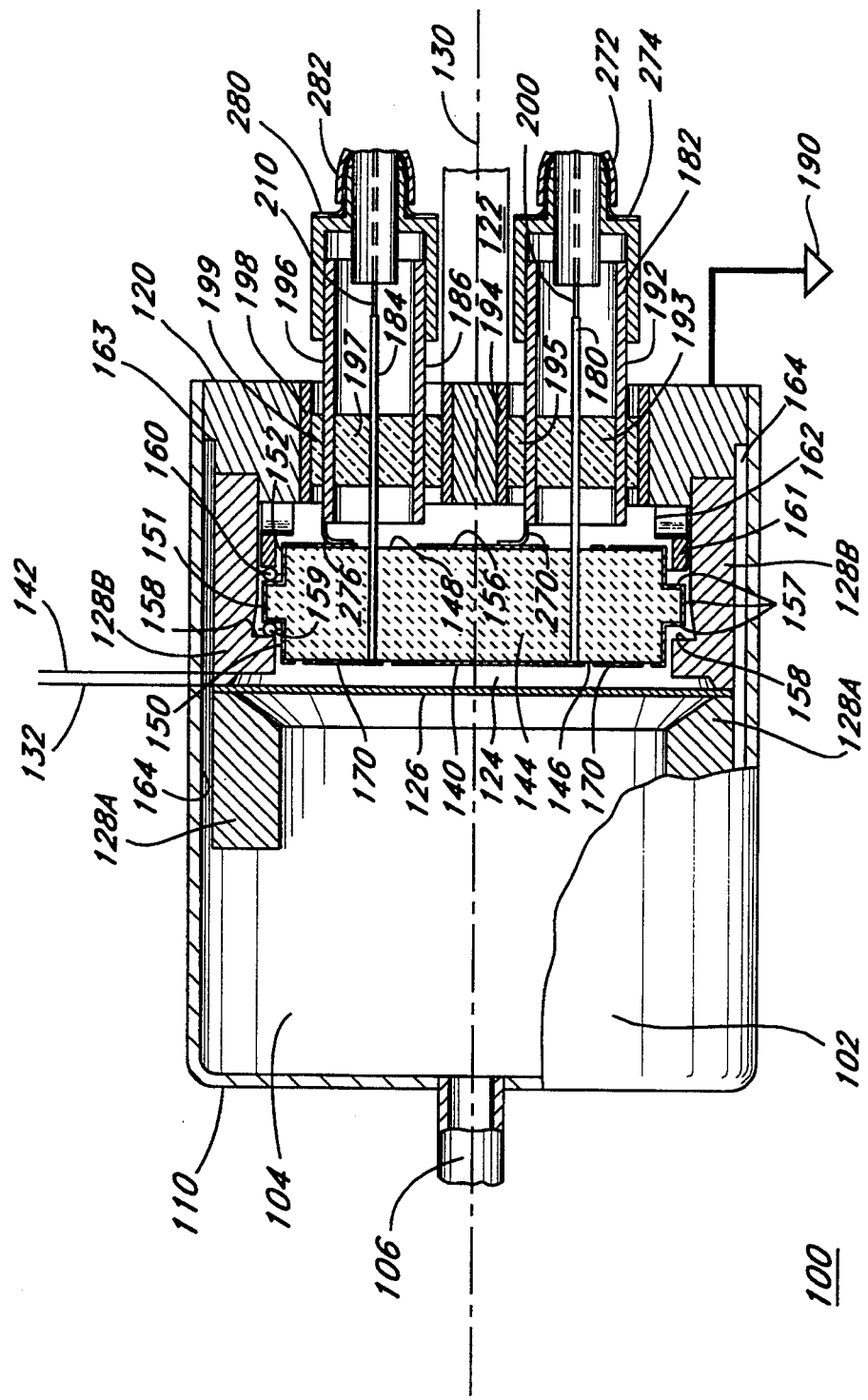
FIG. 4 is a cross-sectional view of the capacitance manometer taken along the lines 4—4 in FIG. 2 showing the positional relationships between the elements of the manometer.

FIGS. 1 and 2 illustrate a perspective view of the outside of an exemplary 100 milli-torr full scale capacitance manometer 100 having a sensitivity in the range of 10 micro-torr, such as is presently commercially available from Tylan General Corporation of San Diego, Calif. FIG. 3 is an exploded perspective view of the interior portions of the capacitance manometer with the cover removed. FIG. 4 is a cross-sectional view of the assembled capacitance manometer of FIGS. 1 and 2. As illustrated, the capacitance manometer 100 includes a hollow pressure shell 102 providing an gas-tight enclosure in capacitance manometer 100. Access to a first cavity 104 of the hollow pressure shell 102 is provided by a hollow pressure tube 106 which penetrates a first end 110 of the pressure shell 102. The pressure tube 106 is mechanically connected to the first end 110 of the pressure shell 102 by welding or another suitable method to provide a gas-tight seal between the pressure shell 102 and pressure tube 106. The pressure tube 106 is mechanically connected to a source (not shown) of a pressure to be monitored by the capacitance manometer 100. For example, the pressure tube 106 may be welded to a vacuum line (not shown), or the like, so that the pressure in the vacuum line is applied to the first cavity 104 of the pressure shell 102.

As illustrated in FIGS. 2 and 4, the pressure shell 102 includes a second end 120 which is penetrated by a second pressure tube 122. The second pressure tube 122 provides access to a second cavity 124 of the pressure shell 102. The second cavity 124 of the pressure shell 102 is pneumatically isolated from the first cavity 104 by a thin, metallic diaphragm 126. As is well known in the art, the diaphragm 126 typically has a circular shape and is supported around its periphery by a support structure 128. The diaphragm 126 is connected to the support structure 128 by welding or other suitable means to provide a gas-tight seal around the periphery of the diaphragm 126. For example, the support structure 128 preferably comprises a first portion 128A and a second portion 128B (FIG. 3) which are welded together with the diaphragm 126 sandwiches between them.

The diaphragm 126 is subjected to any pressure differential that may exist between the first cavity 104 and the second cavity 124 and generally deform such that it is convex in the direction of the cavity having the lower pressure and concave in the direction of the cavity having the higher pressure. In typical capacitance manometers, the diaphragm 126 is circular and is symmetrical about an axis of symmetry 130. The axis of symmetry 130 is perpendicular to a plane 132 that corresponds to the undeflected (i.e., flat) condition of the diaphragm 126. The maximum deflection of the diaphragm 126 in response to a pressure differential is experienced by the central portion of the diaphragm 126 along the axis of symmetry 130. Thus, the direction of the deflection is perpendicular to the plane 132. Since the periphery of the diaphragm is secured to the support structure 128, it is substantially immovable in response to changes in the differential pressure. Thus, the portions of the diaphragm 126 which are closer to the periphery than to the center have substantially less movement than the center portion of the diaphragm 126.

The second pressure tube 122 is connected, by welding or other means, to a source of a known reference pressure or to another pressure source to which it is desired to compare the pressure applied to the first pressure tube 106. Alternatively, and as is illustrated in FIGS. 2 and 4, the second pressure tube 122 is used to provide access to the second cavity 124 to subject the second cavity 124 to a known, fixed reference pressure. Thereafter, while maintaining the fixed reference pressure constant, the second pressure tube 122 is pinched off and permanently sealed so that the second cavity 124 is maintained at the fixed reference pressure. Thus, the pressure applied to the first pressure tube 106 is always compared to the known fixed reference pressure. The pressure applied to the second pressure tube 122 can be selected during the manufacturing process to provide capacitance manometers having selected operating ranges. For example, in order to measure very low pressures (i.e., subatmospheric pressures), the second cavity 124 is evacuated via the second pressure tube 122 to a pressure comparable to the desired pressure range.

In typical capacitance manometers, particularly those for measuring absolute pressures, the second end 120 may include a getter enclosure 136. The getter enclosure 136 houses a getter material (not shown) which is isolated from the second cavity 124 by a screen 138 (FIG. 3). The getter material removes traces of gas that remain after the second cavity 124 is evacuated and the second pressure tube 122 is closed. The removal of the residual gas is preferred so that it does not interfere with the accuracy of the pressure measurements.

The metallic diaphragm 126 is positioned proximate to a first fixed electrode 140. Preferably, the first fixed electrode 140 is generally circular and lies in a plane 142 parallel to the plane 132 and thus perpendicular to the axis of symmetry 130. The first fixed electrode 140 is mounted on a first surface 146 of a generally disc-shaped, electrically insulating fixed electrode support 144.

The outer periphery of the fixed electrode support 144 includes a first peripheral surface 150, a second peripheral surface 151 and a third peripheral surface 152. The circumference of the second peripheral surface 151 is greater than the circumference of the first and third peripheral surfaces 150 and 152 so that a first shoulder 153 is defined between the first peripheral surface 150 and the second peripheral surface 151 and a second shoulder 154 is defined between the second peripheral surface 151 and the third peripheral surface 152.

A first electrically conductive guard 156 is positioned substantially in the center of a second flat surface 148 of the electrode support 144. A second electrically conductive guard 157 is positioned on the first flat surface 146 adjacent to the first peripheral surface 150 and it extends over the first peripheral surface 150, the second shoulder 153, the second peripheral surface 151, the first shoulder 154, and the third peripheral surface 152 onto the second flat surface 148 of the fixed electrode support 144 thereby forming an annular ring on the fixed electrode support 144 spaced apart from the first electrically conductive guard 156. The electrically conductive guards 156 and 157 operate to minimize leakage capacitance from the fixed electrodes 140 and 170 as is further described below. Additionally, the surface of peripheral surface 152 is also coated with an insulating glass 318 (FIGS. 6 and 7) to further minimize leakage capacitances.

A first set of rolling bearings 159 is positioned between the first fixed support shoulder 153 of the electrode support 144 and a support structure shoulder 158. The bearings in the first set of rolling bearings 159 are preferably made of an electrically insulating material such as industrial sapphire. The roller bearings 159A, 159B, and 159C have equal diameters and are spaced apart around the first fixed electrode support shoulder 153 by equal distances and are thus positioned 120 degrees apart along the first fixed electrode support shoulder 153. A first bearing retainer 300 is provided for the first set of roller bearings 159. The first bearing retainer 300 is a thin annular ring of metal or other suitable material having an opening 302 for each of the roller bearings 159. The openings 302 are configured to retain the roller bearings 159 while permitting the roller bearing 159 to make contact with both the support structure shoulder 158 and the first shoulder 153 of the fixed reference support member 140. The second electrically conducting guard 157 on the first shoulder 153 contains an opening 310 (FIG. 3) for each of the roller bearings 159 so as to minimize wear on the second electrically conducting guard 156.

A second set of roller bearings 160 is positioned adjacent to the second shoulder 154. The roller bearings 160A, 160B and 160C also have equal diameters and are equally spaced apart around the perimeter of the second shoulder 154 and are thus positioned 120 degrees apart along the first fixed electrode support shoulder 153. A second bearing retainer 304 is provided for the second set of roller bearings 160. The second bearing retainer 304 is also a thin annular ring of metal or other suitable material having an opening 306 for each of the roller bearings 160. The openings 306 are configured to retain the roller bearings 160 while permitting a the roller bearing 160 to make contact with both the second shoulder 154 and a circular wave washer 162.

The second set of roller bearings 160 and the second bearing retainer 304 are held in place against the second support shoulder 154 by the action of a circular wave washer 162 against a thrust ring 161. The action of the circular wave washer 162 against the thrust ring 161 also holds in place the fixed electrode support 144 against the first set of roller bearings 159 with the first set of roller bearings 159 making contact with the support structure shoulder 158. Pressure is applied against the wave washer 162 and thus against the fixed electrode support 144 by the second end 120 of the pressure shell 102. The second end 120 of the pressure shell 102 is secured to the support structure 128 by welding or any other suitable fastening means to provide an gastight seal. Typically, the inside diameter of the pressure shell 102 is larger than the outside diameter of the second end 120. The second end 120 also includes a shoulder 163 that has a diameter that is larger than the outside diameter of the support structure 128. The pressure shell 102 is welded to the shoulder 163 of the second end 120 so that a small gap 164 (FIG. 4) remains between the outside of the support structure 128 and the inside of the pressure shell 102, thereby isolating the support structure 128 from the pressure shell 102. As illustrated, the fixed electrode support 144 is positioned within the second cavity 124. Typically, a small groove or other opening is formed in the fixed electrode support 144 to assure that the pressure is equalized on both sides of the fixed electrode support 144.

Preferably, the roller bearings 159 and 160 minimize erroneous capacitance measurements by permitting the fixed electrode support 144 to expand and contract in a direction parallel to the plane 130 (FIG. 4) as a result of differences in temperature. The operation of a capacitance manometer equipped with these roller bearings 159 and 160 is described in greater detail in U.S. Pat. No. 4,823,603 to Ferran, et al., issued Apr. 25, 1989, which is hereby incorporated by reference.

The diaphragm 126 and the first fixed electrode 140 comprise the two plates of a parallel plate capacitor with the space therebetween comprising the dielectric of the capacitor. For example, in exemplary capacitance manometers for measuring sub-atmospheric pressures, the dielectric constant of the space between the diaphragm 126 and the first fixed electrode 140 approaches the dielectric constant of a vacuum. It can be readily understood that the movement of the central portion of the diaphragm 126 along the axis of symmetry 130 toward and away from the first fixed electrode 140 causes the distance between the diaphragm 126 and the first fixed electrode to change and thus causes the capacitance between the two electrodes to change. Thus, the diaphragm 126 and the first fixed electrode 140 comprise a variable capacitor. The capacitance is monitored and changes in the pressure differential between the fist cavity 104 and the second cavity 124 is determined from the changes in the measured capacitance.

Because there may be significant changes in the capacitance between the diaphragm 126 and the fixed electrode 140 caused by changes in temperature and other non-pressure changes, the measurement of capacitance changes is accomplished by providing two variable capacitors that change differently in response to pressure changes but which have substantially the same change in response to temperature changes and the like. The device illustrated in FIGS. 1-4, includes a second fixed electrode 170 provided by an electrically conductive annular ring 170 that is generally concentric with the first fixed electrode 140 and is spaced apart from the outer periphery of the first fixed electrode 140. The diaphragm 126 and the second fixed electrode 170 comprise a second variable capacitor.

However, as discussed above, the movement of the diaphragm 126 in response to pressure changes is concentrated near the center of the diaphragm 126, i.e., along the axis of symmetry 130. Thus, since the second fixed electrode 170 is positioned proximate to the outer portion of the diaphragm 126 rather than proximate to the central portion of the diaphragm 126, the capacitance between the diaphragm 126 and the second fixed electrode 170 experiences a substantially smaller change in capacitance relative to the change in capacitance between the diaphragm 126 and the first fixed electrode 140. Thus, the differential changes in capacitance are measured to determine the differential pressure changes.

On the other hand, the capacitance between the second fixed electrode 170 and the diaphragm 126 and the capacitance between the first fixed electrode 140 and the diaphragm vary in approximately the same amount and the same direction (i.e., increasing or decreasing capacitance) in response to temperature changes and linear movement (i.e., movement of the two fixed electrodes towards and away from the diaphragm). This "common mode" change in capacitance can generally be ignored and is readily removed by known electronic filtering circuits.

The first fixed electrode 140 is electrically connected to a conductor 180 which penetrates the fixed electrode support 144 and the second end 120. For example, as illustrated, the conductor 180 is advantageously the center conductor of a first hermetically-sealed coaxial connector 182 that is fastened to the second end 120 by welding or other suitable means to provide an gas-tight seal. Similarly, the second fixed electrode 170 is electrically connected to a conductor 184 which also penetrates the fixed electrode support 144 and the second end 120. The second conductor 184 is advantageously the center conductor of a second hermetically-sealed coaxial connector 186 that is also fastened to the second end 120. Typically, the support structure 128, the second end 120, the pressure shell 102 and the first hollow pressure tube 106 comprise electrically conductive materials. Also typically, one or more of these elements is electrically connected to an electrical ground reference (shown schematically in FIG. 4 by a conventional ground symbol 190). Thus, an electrical connection is completed from the diaphragm 126 to the ground reference. In the embodiment shown, the first coaxial connector 182 includes a concentric outer conductor 192 that is spaced apart and electrically isolated from the center conductor 180 by an insulator 193 comprising glass or another suitable material that also provides a gas-tight seal between the two conductors. In order to electrically isolate the concentric outer conductors 192 from the second end 120 and thus from the ground reference, the first coaxial connector 182 preferably includes a concentric outer shell 194 which surrounds the portion of the outer conductor 192 that passes through the second end 120. The concentric outer shell 194 is spaced apart from and is electrically isolated from the concentric outer conductor 192 by an insulator 195 that also is a gas-tight seal. Similarly, the second coaxial connector 186 includes a concentric outer conductor 196 spaced apart from the electrically isolated from the center conductor 184 by a gas-tight insulator 197. A concentric outer shell 198 surrounds the outer conductor 196 and is spaced apart from the outer conductor 196 by a gas-tight insulator 199.

Figure 8:
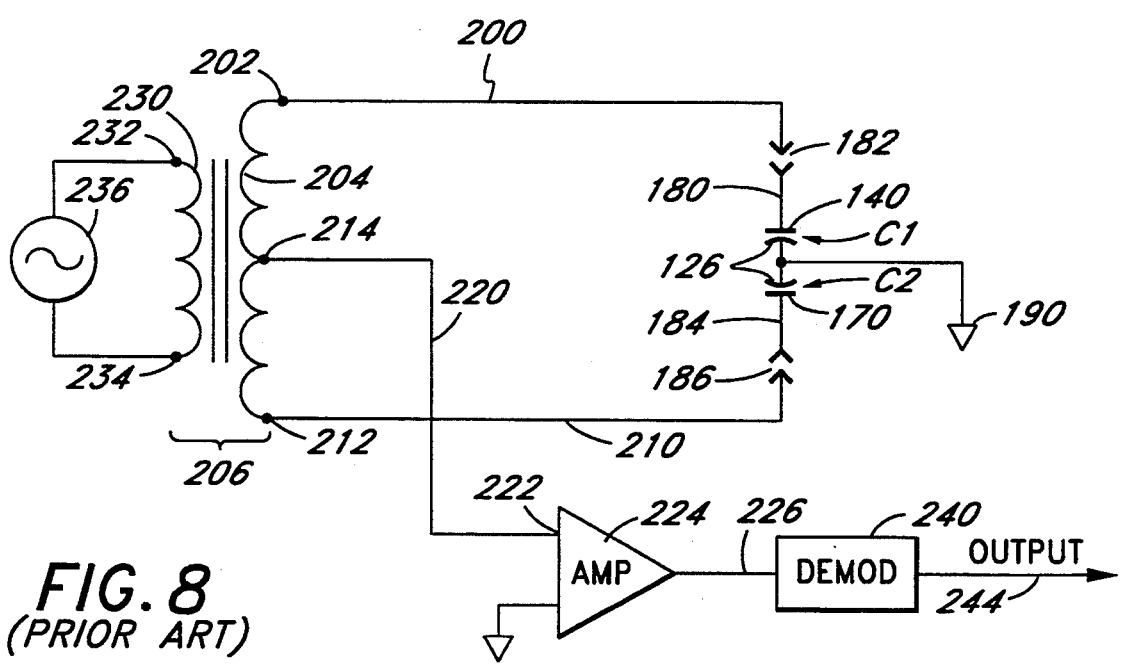
FIG. 8 is a schematic diagram of an exemplary electrical circuit incorporating the capacitance manometer used to explain the basic operation of the capacitance manometer to measure pressure changes.

An exemplary circuit that can be used in combination with the capacitance manometer 100 illustrated in FIGS. 1-7 is shown in FIG. 8. The circuit comprises a first capacitor $C_1$ and a second capacitor $C_2$. As illustrated, the first capacitor $C_1$ corresponds to the variable capacitance between the diaphragm 126 and the first fixed electrode 140. In like manner, the second capacitor $C_2$ corresponds to the variable capacitance between the diaphragm 126 and the second fixed electrode 170. The corresponding reference numerals for the diaphragm and the two fixed electrodes are shown in FIG. 8. The electrodes of the two capacitors corresponding to the diaphragm 126 are connected to the ground reference 190. The electrode 140 of the first capacitor $C_1$ is electrically connected via the conductor 180, the connector 182 and an electrical conductor 200 to a first terminal 202 of a secondary winding 204 of a transformer 206. The electrode 170 of the second capacitor $C_2$ is electrically connected via the conductor 184, the connector 186 and an electrical conductor 210 to a second terminal 212 of the secondary winding 204 of the transformer 206. The secondary winding 204 includes a center tap 214. An electrical conductor 220 connects the center tap 214 to an input 222 of an amplifier 224. The amplifier 224 preferably has a very high input impedance so that substantially zero current flows into the input 222. The amplifier 224 provides an output signal on an electrical conductor 226.

The transformer 206 has a primary winding 230 having a first input terminal 232 and a second input terminal 234. A high frequency signal source 236 is electrically connected to the primary winding via the first and second input terminals 232 and 234 so that the signal generated by the high frequency signal source 236 is applied to the primary winding. The applied signal is coupled to the secondary winding 204 and induces a high frequency voltage across the secondary winding 204. The induced voltage is applied to the first capacitor $C_1$ and the second capacitor $C_2$. It can be seen that the voltage across each of the two capacitors will be inversely proportional to the respective capacitances of the two capacitors and will thus vary in accordance with the deflection of the diaphragm 126 caused by differential pressure across the diaphragm 126.

Since one electrode (i.e., the diaphragm electrode 126) of each of the two capacitors is electrically connected to the ground reference 190, the voltage differential will appear as a voltage differential between the first fixed electrode 140 of the first capacitor $C_1$ and the second fixed electrode 170 of the second capacitor $C_2$. This voltage differential causes a voltage to appear on the center tap 214 that is referenced to the ground reference 190 and that is proportional to the differences in the capacitance between the first capacitor $C_1$ and the second capacitor $C_2$. The voltage on the center tap 214 is applied via the conductor 220 to the input 222 of the amplifier 224. The amplifier 224 amplifies the center tap voltage and provides it as an output signal on the conductor 226.

The output signal on the conductor 226 is a time-varying signal at the frequency of the signal source 236 with an amplitude that is proportional to the difference in capacitance. Since the capacitance of the first capacitor $C_1$ varies significantly in response to changes in the pressure differential and since the capacitance of the second capacitor $C_2$ varies relatively little in response to changes in the pressure differential, the amplitude of the time-varying signal output of the amplifier 224 changes in accordance with changes in the pressure differential across the diaphragm 126. The time-varying signal is demodulated by a conventional demodulator 240 to provide an output signal on a conductor 244 having a DC voltage level corresponding to the pressure differential across the diaphragm 126. For example, the demodulator 240 is advantageously a synchronous demodulator known to the art.

The foregoing description of the operation of the described exemplary prior art device assumes that the fixed electrode support is a perfect dielectric having no leakage currents. However, as discussed in U.S. Pat. No. 3,557,621 and U.S. Pat. No. 4,823,603, ambient humidity and other factors can cause leakage currents to flow between the fixed electrodes and other electrically conductive portions of the device. For example, in the described embodiment of FIGS. 1–7, a current leakage path may exist from the second fixed electrode 170 to the support structure 128 via the fixed electrode support shoulder 158 and the first peripheral surface 150 and thus to the ground reference 190. Since the secondary winding 204 of the transformer 206 is floating with respect to the ground reference 190, this leakage current must be provided through the transformer secondary winding 204 from the input 222 of the amplifier 224. Since the input impedance of the amplifier 224 is very high, supplying even a small amount of leakage current changes the voltage on the input to the amplifier 224 and thus results in an erroneous output signal from the output of the amplifier 224.

Figure 6:
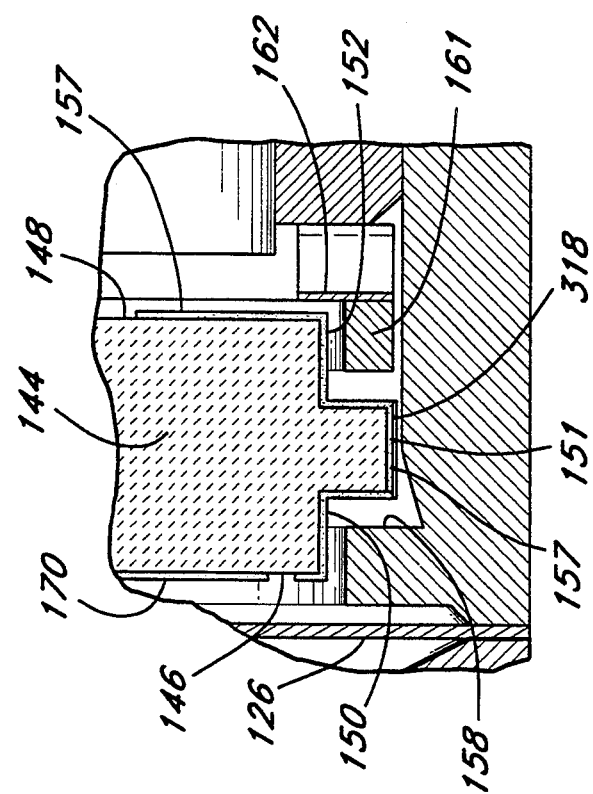
FIG. 6 is an enlarged partial cross-sectional view of the capacitance manometer showing additional detail of the second guard and the layer of glass insulating the second guard on the first, second and third peripheral surfaces of the fixed electrode support.
Figure 5:
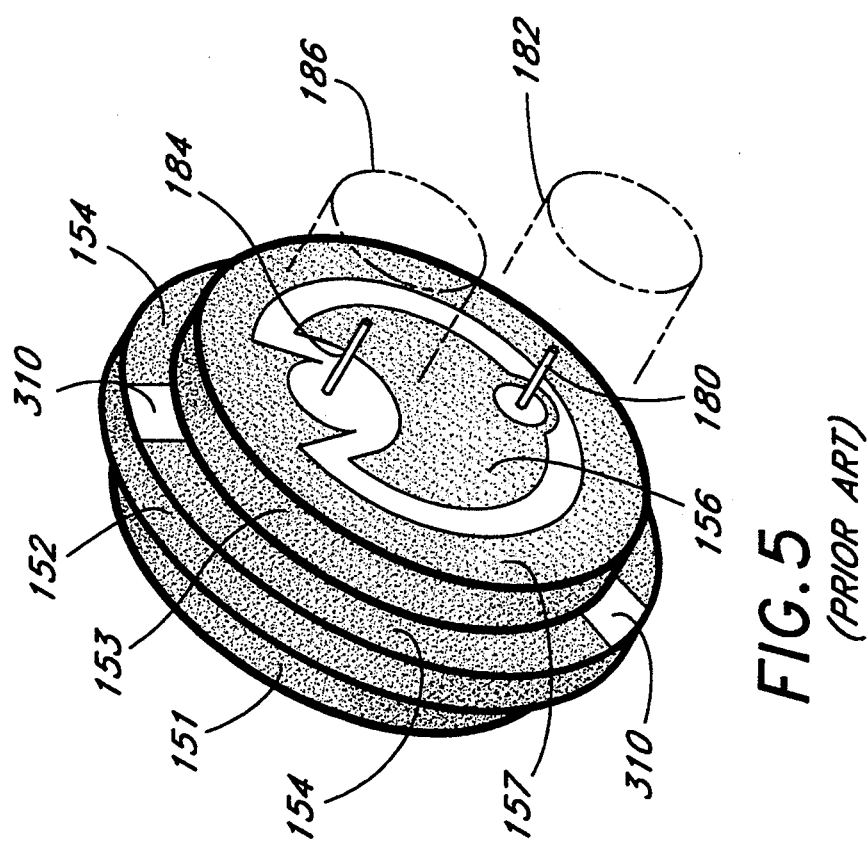
FIG. 5 is a perspective view of the second surface of the fixed electrode support showing the guards positioned thereon.
Figure 7:
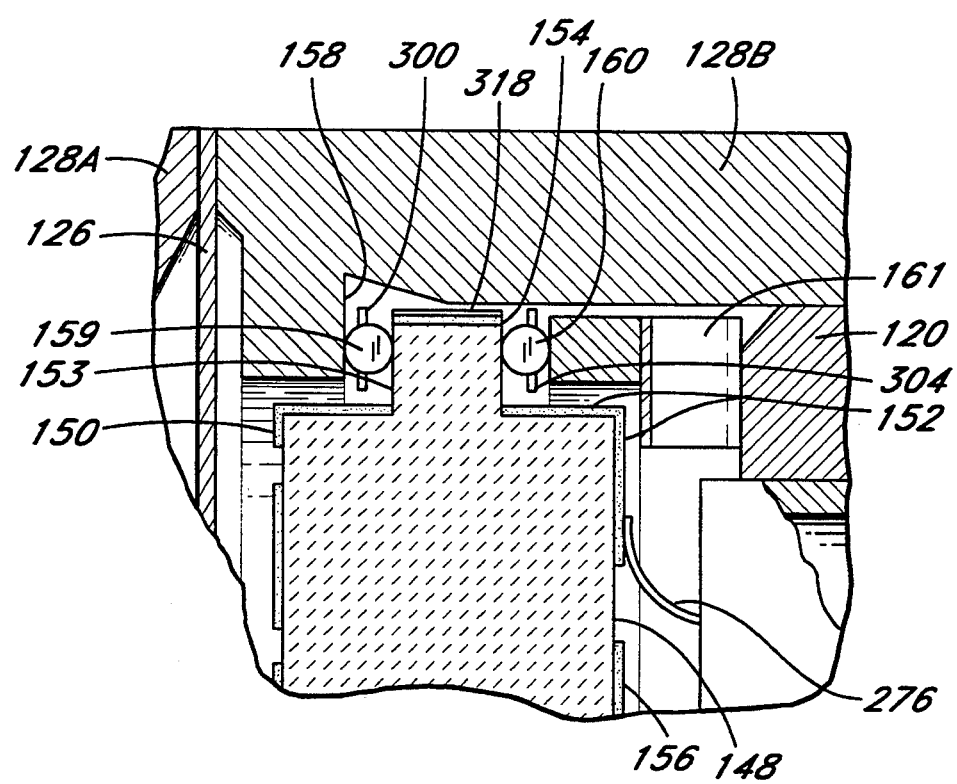
FIG. 7 is an enlarged cross-sectional view of the capacitance manometer showing additional detail of a roller bearing in position between the first fixed electrode support shoulder and the diaphragm support structure shoulder and showing additional detail of a roller bearing in position between the second fixed electrode support shoulder and the thrust ring.

U.S. Pat. No. 4,823,603 describes a solution to the aforementioned problem with leakage currents in which an additional conductive member is positioned across the leakage path from one of the electrodes to the conductive portions of the support structure. An implementation of the solution described in the patent is illustrated in the device of FIGS. 1–7. As shown in FIGS. 5 and 6, a first electrically conductive guard 156 having dimensions that are similar to the dimensions of the first fixed electrode 140 is positioned on the fixed electrode support 144 on a second surface 148 of the fixed electrode support 144. The second surface 148 is opposite the first surface 146 and the first guard 156 is positioned in approximate alignment with the first fixed electrode 140. It can be seen that a leakage path from the first fixed electrode 140 to the second end 120, for example, will cross the first guard 156. In order to block the leakage path to prevent the leakage current from continuing to flow toward the second end 120, a voltage potential equal to the voltage of the first fixed electrode 140 is applied to the first guard 156. Similarly, a second guard 157 is provided to block leakage currents from the second fixed electrode 170.

In the exemplary device illustrated in FIGS. 1–7, the second guard 157 preferably comprises a continuous layer of silver plate extending from the first surface 146 of the electrode support 144 to the second surface 148 while covering the first, second and third peripheral surfaces 150, 151, 152 and the first and second support shoulders 153,154. A voltage having substantially the same magnitude as the voltage on the second fixed electrode 170 is applied to the second guard 157 via the connector 276. Thus, the second guard 157 operates to block leakage currents from the second fixed electrode 170 to adjacent portions of the support structure 128 and the second end 120.

Figure 9:
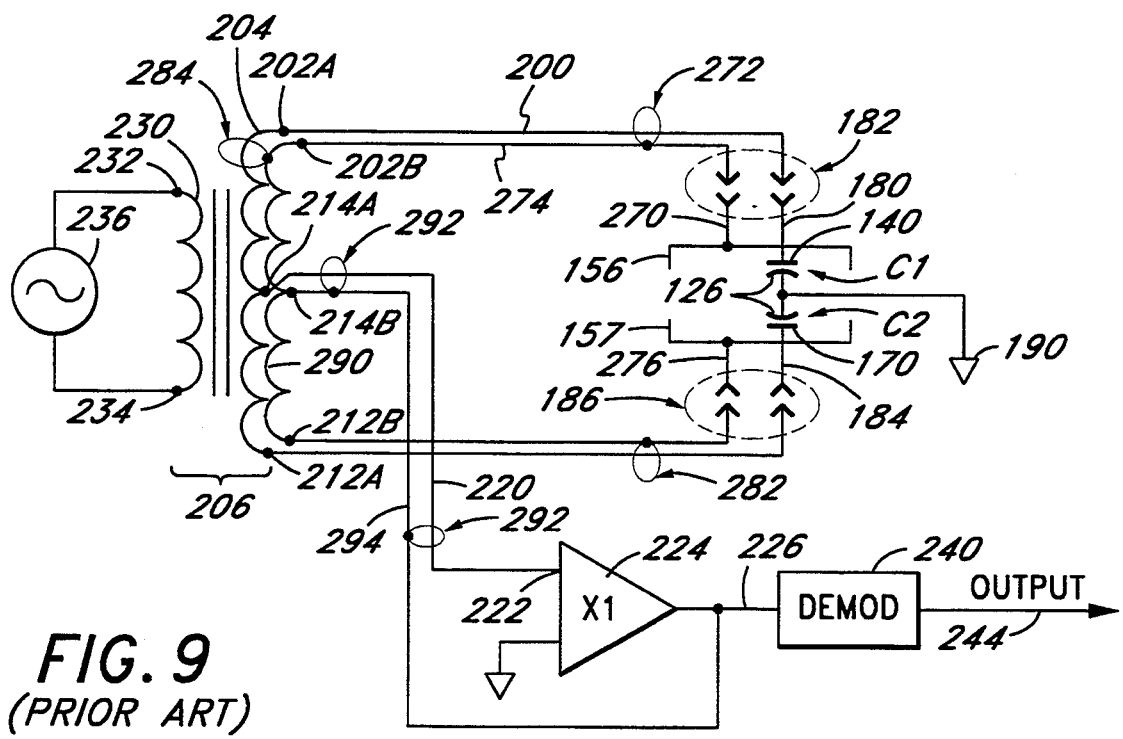
FIG. 9 is a schematic diagram of an exemplary improved electrical circuit used in cooperation with the guard ring electrodes on the fixed electrode support to provide electrical guarding against current leakage caused by stray capacitances in the fixed electrode support.

An exemplary electrical circuit for providing the appropriate voltage to the first guard ring 156 and the second guard ring 157 is illustrated in FIG. 9. In FIG. 9, elements corresponding to the elements of FIG. 8 are labelled as before. In addition, schematic representations of the first guard 156 and the second guard 157 are shown proximate to the first fixed electrode 140 and the second fixed electrode 170, respectively. The first guard 156 is interconnected via a first tab 270 (see FIG. 4), or the like, which is electrically connected to the concentric outer conductor 192 of the first coaxial connector 182. In the electrical circuit of FIG. 9, the electrical conductor 200 is the center conductor 200 of a first coaxial cable 272 that includes an concentric outer conductor 274 that surrounds the center conductor 200. Thus, the concentric outer conductor 192 of the first coaxial connector 182 is electrically connected to the concentric outer conductor 274 of the first coaxial cable 272. In like manner, the second guard 157 is interconnected via a second tab 276 which is electrically connected to the outer conductor 196 of the second coaxial connector 186. The outer conductor 196 is in turn electrically connected to a concentric outer conductor 280 around the electrical conductor 210 which is the center conductor 210 of a second coaxial cable 282.

In FIG. 9, the first terminal 202, the second terminal 212 and the center tap 214 each comprise an A portion and a B portion. The two center conductors 200 and 210 are connected to the first terminal 202A and the second terminal 212A of the secondary winding 204 of the transformer 206, which, in FIG. 9, is the center conductor of a third coaxial cable 284. The third or secondary winding coaxial cable 284 has an outer conductor 290 which is concentric with the inner conductor 204. The outer conductor 290 of the secondary winding coaxial cable 284 is electrically connected at the first terminal 202B with the outer conductor 274 of the first coaxial cable 272, and is electrically connected at the second terminal 212B with the outer conductor 280 of the second coaxial cable 282. The inner conductor 204 and the outer conductor 290 of secondary winding coaxial cable 284 are both subjected to the field induced by the primary winding. The inner conductor 204 and the outer conductor 290 of the secondary winding coaxial cable 284 are center tapped at the center taps 214A and 214B. The center tap 214A of the inner conductor 204 of the secondary winding coaxial cable 284 is electrically connected to the conductor 220, which is preferably the center conductor 220 of a fourth coaxial cable 292 having an outer conductor 294. The center tap 214B of the outer conductor 290 of the secondary winding coaxial cable 284 is electrically connected to the outer conductor 294 of the coaxial cable 292.

The inner conductor 220 of the fourth coaxial cable 292 is electrically connected to the input terminal 222 of the amplifier 224, which, in FIG. 9, is shown as a times 1 ($\cdot$.1) amplifier. In other words, the output of the amplifier 224 on the line 226 tracks the input voltage on the input terminal 222. The line 226 is connected to the input of the demodulator 240 as before. In addition, the line 226 is electrically connected to the outer conductor 294 of the fourth coaxial cable 292 and thus to the outer conductor 290 of the secondary winding coaxial cable 284 at the center tap 214B.

The operation of the circuit of FIG. 9 is substantially the same as the operation of the circuit of FIG. 8. However, the use of the coaxial cable 284 in the secondary winding and the application of the same voltage to the outer conductor 290 as on the inner conductor 204 assures that the voltage on the first guard 156 is substantially identical to the voltage on the first fixed electrode 140 and that the voltage on the second guard 157 is substantially identical to the voltage on the second fixed electrode 170. Thus, leakage currents to and from the fixed electrodes in the fixed electrode support 144 are provided by the respective guards. Since the output of the amplifier 224 is a relatively low impedance output, the small leakage currents which it must source or sink do not have any significant effect on the voltage on the line 226. Thus, the circuit of FIG. 9, in combination with the first guard 156 and the second guard 157 has been found to significantly reduce the effect of the leakage currents on the accuracy of the capacitance manometers constructed in accordance with FIGS. 1-7. For example, the stray capacitances associated with the leakage currents have been reduced from approximately 15 picofarads to approximately one picofarad. The capacitance between the first fixed electrode 140 and the diaphragm 126 is nominally around 30 picofarads, so it can be seen that the shielding effect provided by the first guard 156 and the second guard 157 is very beneficial.

The foregoing description describes a capacitance manometer substantially identical to the capacitance manometer disclosed in U.S. Pat. No. 4,823,603. The use of the roller bearings 159 and 160 minimizes inaccuracies in capacitance measurements by minimizing any flexing or bending of the fixed electrode support 144 due to thermal expansion and contraction of the fixed electrode support 144. Further, application of voltages to the first electrically conductive guard 156 and the second electrically conductive guard 157 also minimizes leakage capacitances from the fixed electrodes 140 and 170. By minimizing stray capacitances, and minimizing the deflection of the fixed electrode support 144, the accuracy and sensitivity in the measured capacitance of the capacitance manometer is substantially improved. Since the ability of the capacitance manometer to detect changes in pressure is directly related to the accuracy of the manometer in measuring changes in capacitance, capacitance manometers of the type described above can have increased sensitivity such that they can detect changes in pressure in the range of 10 micro-torr. As used herein, a "greater" or "increased" sensitivity means that the manometer can measure much smaller pressures (e.g., down to 1 micro-torr versus down to 10 micro-torr).

Although these capacitance manometers have sufficient sensitivity to detect pressure changes in the range of 1 micro-torr which cause deflections of the diaphragm 126, such small pressure changes are indistinguishable from vibrationally induced forces or gravitational forces which also cause mechanical deflections of the flexible diaphragm 126. The preferred embodiment of the present invention shown in FIGS. 10-14 below describe a pressure sensing system incorporating two of the capacitance manometers described previously in reference to FIGS. 1-7. A system in accordance with the present invention is insensitive to vibrationally induced forces or gravitational forces and consequently is capable of detecting pressure changes in the range of 1 micro-torr.

DESCRIPTION OF A PREFERRED EMBODIMENT OF THE PRESENT INVENTION

Figure 10:
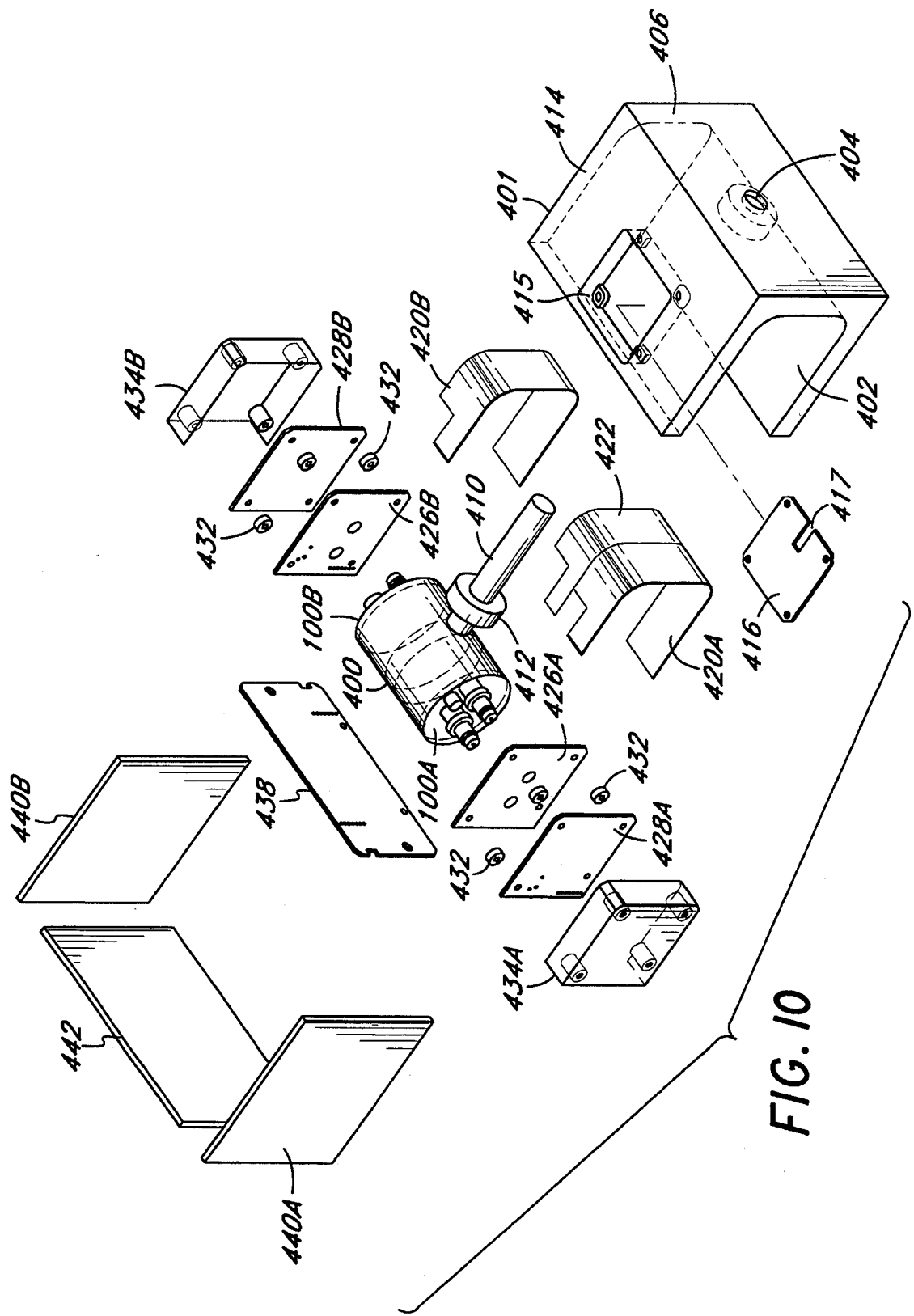
FIG. 10 is an exploded perspective view of the pressure sensor of the present invention showing the basic components of the pressure sensor.

FIGS. 10 illustrates a pressure sensor 400 of the present invention mounted within a oven assembly 401. The oven assembly 401 is designed to heat the pressure sensor 400 to a constant temperature of, for example, 75° C. in a well known fashion to maintain the temperature at constant value to minimize any changes in the operation of the manometer caused by expansion and contraction of the materials of which it is constructed, and also to minimize the effects of condensation of water or other materials within the sensor 400. Condensation can cause materials to accumulate on the diaphragm and thereby affect the accuracy of the manometer. The temperature can be maintained lower if condensation is not a significant problem, or it can be maintained higher if condensation is a significant problem.

The oven assembly 401 includes a substantially U-shaped body 402 and, on a front face 406, the body 402 contains an opening 404 for a tube or pipe 410 which connects the sensor 400 to the source of unknown pressure or pressure to be measured. Mounted on the tube 410 is a fitting 412 which couples to the body 402 to fixedly secure the tube 410 to the body 402. Positioned on the a upper surface 414 of the body 402 is a recess 415 which is covered by a plate 416 secured to the upper surface by screws (not shown). The plate 416 also include a slot 417 which provides access for the control and power wiring for the sensor 400 and the oven assembly 401.

Positioned on the interior surfaces of the body 402 are two heating elements 420A and 420B and a temperature sensor 422. The heating elements 420A and 420B and the temperature sensor 422 are configured to flushly mount on the interior surfaces of the body 402 and are preferably secured thereto by adhesives. The heating elements 420A and 420B are appropriately sized to heat the oven assembly 401 and the sensor 400 to maintain a constant temperature of 75° C., or other selected temperature, and are 30 watt, 30 volt heaters in one particular embodiment. In the preferred embodiment, the temperature sensor 422 is a 4500 parts per million per degree Celsius (4500 ppm/° C.) temperature sensitive resistance which provides feedback to a heater control circuit board (not shown) which is mounted in the recess 415. The heater control circuit board is configured, in any of a number of well known manners, to provide varying voltages to the heaters 420A and 420B to maintain the oven assembly at the desired temperature. The heating elements 420A and 420B, temperature sensor 422 and the heater control circuit are advantageously commercially available units.

The pressure sensor 400 is then positioned within the enclosed area defined by the U-shaped body 402 adjacent the heaters 420A and 420B and the temperature sensor 422 with the tube 410 extending through the hole 404 in the front face 406 of the body 402. The sensor 401 comprises a first capacitance manometer 100A and a second capacitance manometer 100B which are both connected to a common pressure chamber 418. The tube 410 supplying the unknown pressure to the pressure sensor 400 is connected to the common pressure chamber 418 so that the unknown pressure is supplied directly into the common pressure chamber 418 as is more clearly shown in FIG. 11 below.

The capacitance manometers 100A and 100B are preferably 100 milli-torr, full scale, capacitance manometers substantially identical to the prior art capacitance manometer described previously in reference to FIGS. 1–7 having potential sensitivities in the range of 0.01–0.1 micro-torr. The two manometers 100A and 100B do not have the pressure shells 102. Instead, the two manometers are mounted in a common pressure shell 424 which is welded to the shoulder 163 of the second end 120 of each manometer so that the two manometers are centered about their axes 130 which is shown as a common axis 130 in FIG. 11. The capacitance manometers 100A and 100B are mounted so that the respective diaphragms 126 face each other across the common pressure chamber 418 formed by the common pressure shell 424 so that both manometers are exposed to the same pressure. Any difference in the reference pressures in the second cavities 124 of the two manometers 100A and 100B can be accommodated by calibration.

A shield 426A and 426B and a pressure sensor circuit board 428A and 428B are positioned adjacent to the second end 120 of each of the capacitance manometers 100A and 100B. The pressure sensor circuit boards 428A and 428B respectively receive signals from the capacitance manometers 100A and 100B indicative of the unknown pressure and also generate appropriate voltage signals to the capacitance manometers 100A and 100B to minimize leakage currents in the fashion that was previously described in reference to the exemplary circuit shown in FIG. 9. Consequently, the pressure sensor circuit boards 428A and 428B contains circuitry and components analogous to the circuitry and components shown in the exemplary circuit of FIG. 9.

The shields 426A and 426B are interposed between the second end 120 of the capacitance manometers 100A and 100B and the circuit boards 428A and 428B to minimize the effects of stray capacitance on the capacitance signal generated by the manometers 100A and 100B. The shields 426A and 426B each contain openings 430 to permit electrical connections between the circuit boards 428A and 428B and the capacitance manometers 100A and 100B. Further, the shields 426A and 426B are spaced apart from the circuit boards 428A and 428B by non-conductive spacers 432 to further minimize the effects of stray capacitance.

Outer shields 434A and 434B are respectively positioned adjacent the sides of the circuit boards 428A and 428B opposite the shields 426A and 426B. The outer shields 434A and 434B further protect the circuit boards 428A and 428B and the capacitance manometers 100A and 100B from any stray capacitance from outside the sensor 100. Consequently, the outer shields 434A and 434B are preferably dimensioned so as to fit flushly against the inner surfaces of the body 402 to effectively form end pieces for each of the end openings formed by the U-shaped body 402. The entire assembly comprising the pressure sensor 400, the shields 426A and 426B, the circuit boards 428A and 428B and the outer shields 434A and 434B is secured by screws or other suitable fasteners (not shown).

A main circuit board 438 is also positioned within the area defined by the U-shaped body 402. The main circuit board 438 receives signals from each of the circuit boards 428A and 428B indicative of the pressure sensed by each of the capacitance manometers 100A and 100B. In response to the received signals, the main circuit board 438 produces an overall signal indicative of the pressure sensed by the sensor 400 which preferably is not affected by any vibrationally induced forces or gravitation forces acting on the diaphragms 126 of the manometers 100A and 100B. Hence, the main circuit board 438 contains circuitry which is described in greater detail with reference to the exemplary circuit shown in FIG. 13 below.

Two side members 440A and 440B are also shown in FIG. 10. The side members 440A and 440B are mechanically connected to the two ends of the U-shaped member 402, preferably by screws. A rear member 442 is mechanically connected to upper surface 414 and the lower surface of the body 402 to thereby cover the open end of the body 402. The side members 440A and 440B and the rear member 442 are appropriately dimensioned so that the sensor 400 and its associated circuitry as well as the heater components of the oven assembly 401 are enclosed within a substantially rectangular shaped box formed from the U-shaped body 402, the side members 440A and 440B and the rear member 442. Thus, the body 402, the side members 440A and 440B and the rear member 442 provide an enclosed environment permitting the heaters 420A and 420B to maintain the desired temperature.

Figure 11:
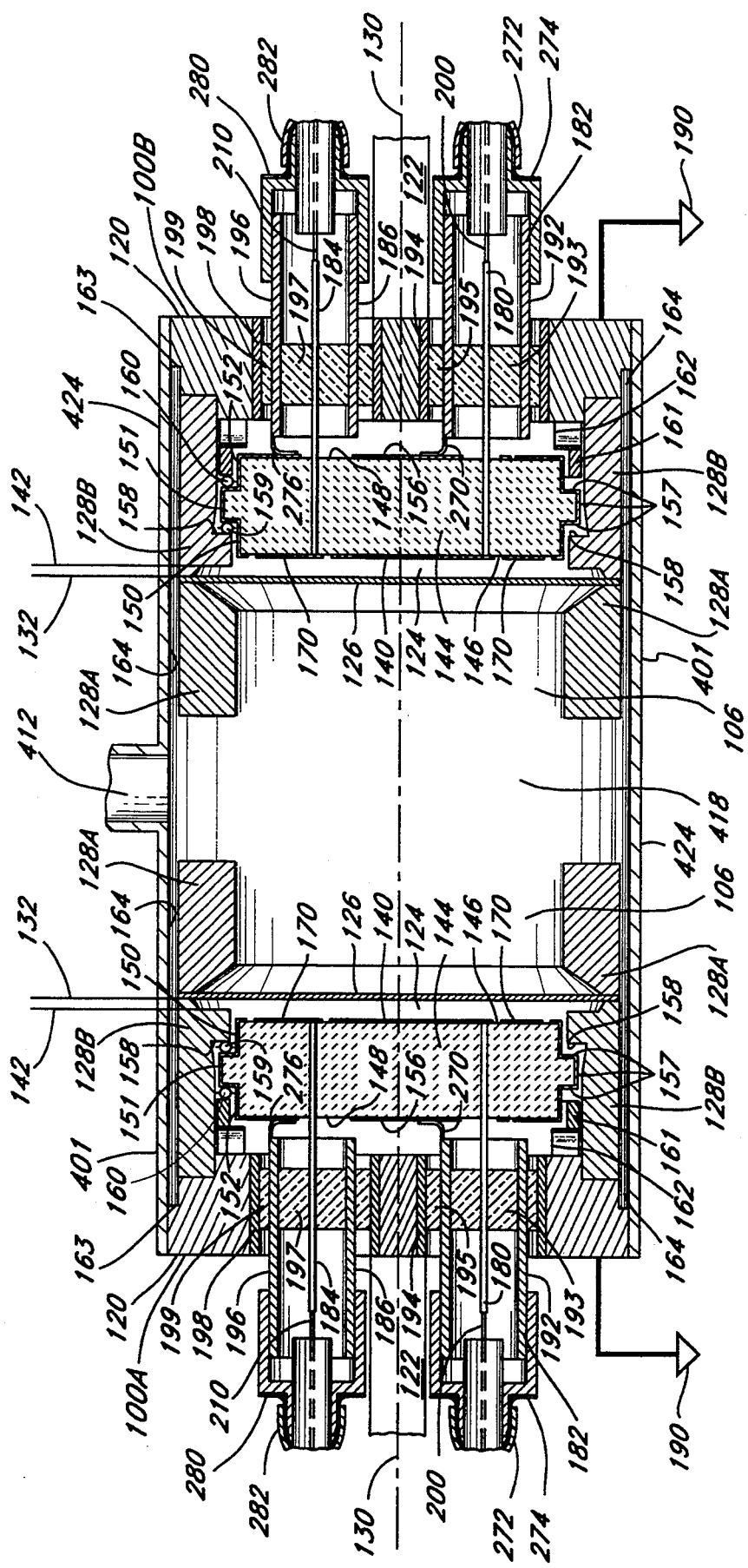
FIG. 11 is a cross-sectional view of the sensor shown in FIGS. 10 taken along the line 11—11 in FIG. 10 illustrating the positional relationships between the components comprising the sensor of the present invention.

FIG. 11 is a cut-a-way view of the pressure sensor 400 illustrating the capacitance manometer 100A and 100B facing each other across the pressure chamber 418 in mirror image fashion to expose both diaphragms 126 to the unknown pressure communicated to the pressure chamber 418 via the inlet tube 410. Hence, assuming that the capacitance manometers 100A and 100B are manufactured to be substantially identical, the amount of mechanical deflection of the flexible diaphragm 126 of each of the capacitance manometers 100A and 100B resulting from the unknown pressure to be measured will be substantially the same but in opposite directions along the common axis 130. This is illustrated in greater detail in FIGS. 12A and 12B which schematically illustrate the sensor 400 with the two capacitance manometers 100A and 100B. For clarity, the components of the capacitance manometer 100A have been labelled with the same reference numerals as were used in conjunction with FIGS. 1–7 followed by the postscript "A". Further the components of the capacitance manometer 100B are assigned similar reference numerals followed by the postscript "B".

In FIG. 12A, the unknown pressure provided to the first cavity 104A and 104B of the capacitance manometers 100A and 100B from the tube 410 via the common pressure chamber 418 is greater than the reference pressure in the second cavity 124A and 124B. Hence, the diaphragms 126A and 126B in FIG. 12A are convexly deformed in the direction of the second cavities 124A and 124B, respectively, thereby indicating that the unknown pressure is greater than the reference pressure. The amount of mechanical deformation of the diaphragm is proportional to the difference in pressure between the unknown pressure and the reference pressure. When the capacitance manometers 100A and 100B are connected to an electrical circuit similar to those exemplified in FIGS. 8 or 9, a proportionately smaller capacitance in both of the capacitance manometers 100A and 100B is measured. The capacitance is thus indicative of the magnitude of the unknown pressure.

In FIG. 12B, the diaphragms 126A and 126B are convex in the direction of the first cavity 104A and 104B respectively, thereby indicating that the unknown pressure being sensed is smaller than the reference pressure. When the capacitance manometers 100A and 100B are respectively connected to a circuit similar to those exemplified in FIGS. 8 and 9, a larger capacitance in both the capacitance manometers 100A and 100B proportionate to the unknown pressure would be measured. Assuming that the components of the manometers 100A and 100B are identical, and that both the manometers 100A and 100B are connected to identical electrical circuits, both of the circuits ideally would provide an identical output signal indicative of the magnitude of the unknown pressure. Circuitry interpreting the signals from both the capacitance manometers 100A and 100B is preferably included on the main circuit board 438 (FIG. 10) and is described further in reference to the exemplary circuit shown in FIG. 13.

As previously described, vibrationally induced forces or gravitational forces can cause a mechanical deflection in the diaphragm 126 of the prior art capacitance manometer 100 shown in FIG. 1-7, which is indistinguishable from the mechanical deflection that results from changes in the sensed pressure. Consequently, the circuits exemplified in FIGS. 8 and 9 would produce a signal indicating a change in the pressure being sensed when in fact this pressure had not changed but a vibration had been applied to the prior art capacitance manometer 100.

FIG. 12C diagrammatically illustrates the problem experienced by the prior art capacitance manometer 100. In FIG. 12C, a schematic of the prior art capacitance manometer 100 is shown as having been oriented such that the second end 110 and the fixed electrode support 144 is exactly parallel to the ground so that gravity causes the diaphragm to deflect downward. The same effect can occur as a result of a vibration having vibratory motion along the axis 130. Although the manometer 100 can be calibrated in a particular orientation to compensate for deflection caused by that particular orientation, it is not possible to compensate for the time-varying deflections caused by vibrations applied to the prior art manometer or to compensate for temporary reorientation of the manometer. (Note that in FIGS. 12C and 12D, the deflections of the diaphragms 126 of both the prior art capacitance manometer 100 and of the sensor 400 of the present invention while being subjected to vibration or to a change in orientation have been exaggerated for the sake of clarity.

In FIG. 12C, the force acting upon the flexible diaphragm 126 causes the diaphragm 126 to convexly deform in the direction of the second cavity 124 and the fixed electrode support 144. The force-induced mechanical deflection of the flexible diaphragm 126 is no different than the mechanical deflection the flexible diaphragm 126 would experience by a like change in the sensed pressure in the cavity 104. Consequently, because the flexible diaphragm 126 is closer to the fixed electrode support 144, the capacitance measured by the exemplary circuit shown in FIGS. 8 or 9 would be less, causing the circuit to produce a signal indicating a change in pressure which would be indistinguishable from a signal produced when the pressure has actually changed to deflect the diaphragm by a corresponding amount.

FIG. 12D diagrammatically illustrates the operation of one preferred embodiment of the pressure sensor 400 of the present invention when subjected to the same force as applied to the prior art capacitance manometer 100 in FIG. 12C. The vibration induced or gravitational force causes the flexible diaphragm 126A in the manometer 100A to become convex in the direction towards the common pressure chamber 418, and, at the same time, it causes the flexible diaphragm 126B in the manometer 100B to become convex in the direction away from the common pressure chamber 418. Consequently, the measured capacitance of the manometer 100A increases, whereas the measure capacitance of the manometer 100B correspondingly decreases. In an ideal sensor 400, with identical manometers 100A and 100B, the increase in capacitance from the manometer 100A should be exactly equal in magnitude to the decrease in capacitance from the manometer 100B. Thus, summing the output signals from the exemplary circuit shown in FIG. 9 for each of the manometers 100A and 100B results in a summed output signal where the changes due to the vibrational or gravitational force on each of the manometers 100A and 100B preferably cancel each other.

Hence, by combining output signals indicative of the capacitance measured by the capacitance manometers 100A and 100B in the sensor 400, an output signal can then be generated which is indicative of the unknown pressure but which is insensitive to the effects of vibrational forces or changing gravitational forces. As illustrated in FIG. 12A and 12B, the unknown pressure generates capacitance signals on each of the manometers 100A and 100B. Further, as illustrated in FIG. 12D, while gravitational forces result in changes in the capacitance signals produced by the manometers 100A and 100B, the changes are opposite for each capacitance signal.

A sum of all of these signals preferably cancels or minimizes the signals resulting from the force, leaving only the signals resulting from the difference between the unknown and reference pressures. Consequently, a circuit can be configured which combines these output signals in such a way that the changes due to the force changes cancel each other out, and an output signal indicative of the unknown pressure is produced which is unaffected by any vibratory forces or any changes in the gravitational forces.

Figure 13:
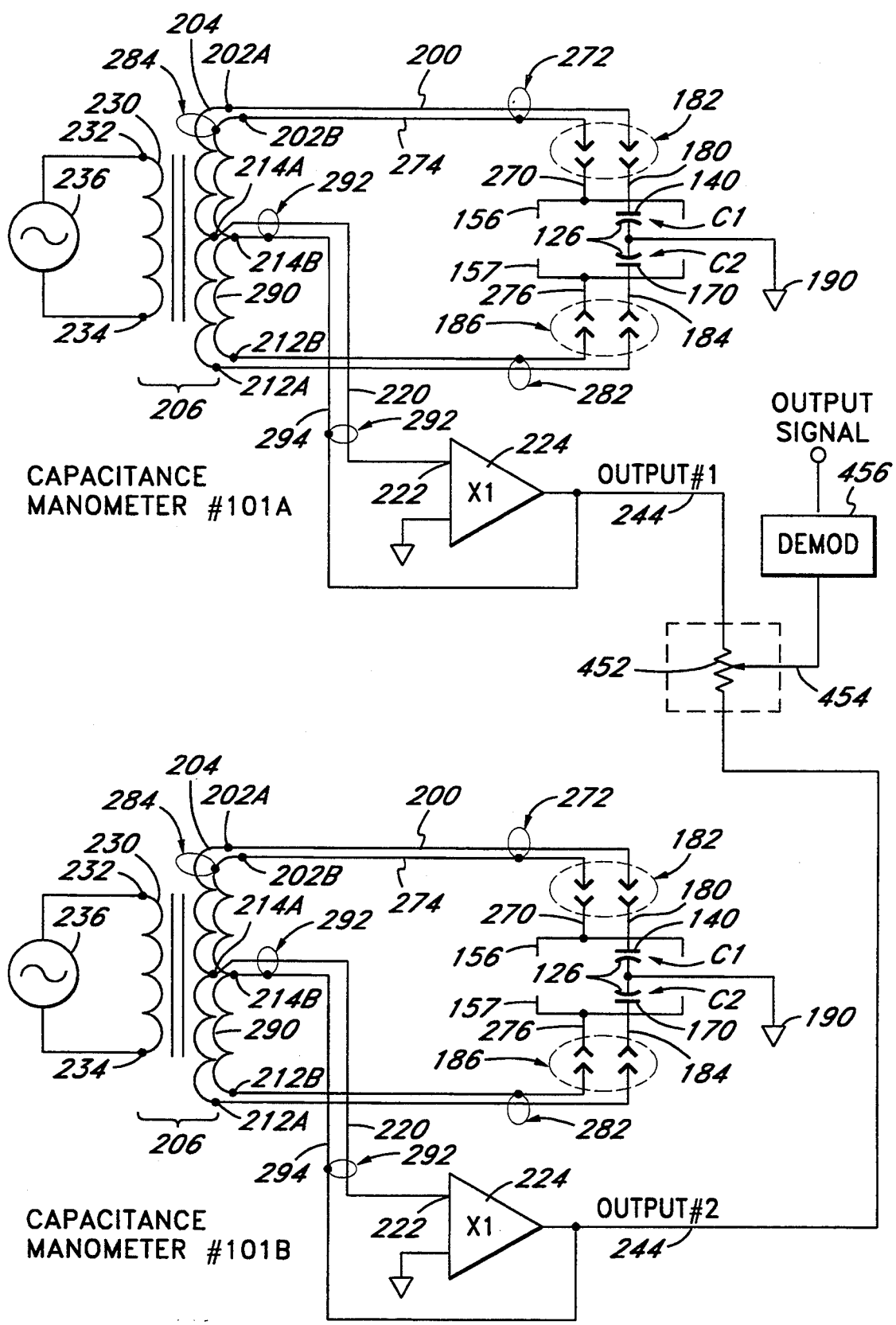
FIG. 13 is a schematic diagram of an exemplary electrical circuit incorporating the sensor of the present invention used to generate a signal indicative of the unknown pressure.

An exemplary circuit configured to accomplish this task is illustrated in FIG. 13 which comprises a combination of two of the prior art circuits shown in FIG. 9 and described in detail with reference thereto. The upper circuit in FIG. 13 comprises the circuit from FIG. 9 for the first manometer 100A, and the lower circuit in FIG. 13 comprises the circuit from FIG. 9 for the second manometer 100B. The output signals on the lines 244 of each of the circuits in FIG. 13 are summed through a potentiometer 450 to provide a summed output signal from the wiper of the potentiometer on a line 452. The summed output signal on the line 452 is then demodulated in a demodulator 454 and is otherwise processed to provide a signal indicating the magnitude of the unknown pressure.

As discussed above, the capacitance manometers 100A and 100B of this preferred embodiment of the present invention are identical, hence, any vibrationally or gravitationally induced changes in the signal produced by the capacitance manometers 100A and 100B in the sensor 400 should sum to zero. However, due to practical difficulties involved in manufacturing and assembling the capacitance manometers 100A and 100B, as well as the accompanying electrical circuitry of FIG. 13, it is difficult to produce identical capacitance manometers and circuits. Thus, the changes in the output signals indicative of the capacitance sensed by each of the manometers 100A and 100B due to the vibrational and gravitational forces rarely sum to zero.

However, output signal produced by the potentiometer 450 in FIG. 13 can be adjusted so that it is insensitive to any vibrational or gravitational forces. Specifically, the sensor 400 of the present embodiment can be trimmed by adjusting the potentiometer 450 to provide an output signal that does not change when the sensor 400 is vibrated, thus nulling the effects of vibrational and gravitational forces. Basically, the potentiometer 450 is adjusted so that the differential effects caused by the force on one diaphragm causing the capacitance to be increased while the other is decreased are precisely canceled in the potentiometer 450. On the other hand, the common mode effects of pressure which cause both diaphragms to move in the same direction are additive in the potentiometer. This trimming can occur as part of the manufacturing process of the sensor 400 or it can occur after extended operation of the sensor 400 to account for different fatigue factors of the various components comprising the sensor 400. The trimming can be performed, for example, by vibrating the assembled system 400 on a vibration table at a predetermined rated and adjusting the potentiometer 450 until all effects of the vibration disappear from the output signal from the potentiometer 450 and thus do not appear in the demodulated output signal from the demodulator 454.

The foregoing discussion describes a gravity and vibration insensitive pressure sensor. The gravity and vibration insensitivity of the sensor permits it to be used in applications where prior art capacitance manometers would be unable to distinguish between a slight change in pressure and a vibration of the manometer. Furthermore, the sensor of the present invention can also be used to measure pressure differences with a sensitivity on an order of magnitude greater than the sensitivity of prior art sensors due to the elimination of vibrationally induced error.

The preferred embodiment of the present invention have been principally shown and described as relating to a sensor having two substantially identical capacitance manometers centered about the same axis and positioned in mirror image to each other. However, it should be understood that the present invention could also include a pressure sensor having two or more variable capacitors positioned so that they do not produce opposite changes of substantially equal magnitude in the measured capacitances when subjected to gravity so long as the changes resulting from vibrational or gravitational forces are oppositely directed. As an electrical circuit can always be incorporated which measures the capacitances and compensates for the gravitationally induced changes.

Consequently, although the above detailed description has shown, described and pointed out the fundamental novel features of the invention in one particular embodiment, it will be understood that various omissions and substitutions and changes in the form and detail of the device illustrated may be made by those skilled in the art, without departing from the spirit of the invention.

What is claimed is:

1. A pressure sensor, comprising:
   a common pressure chamber receiving a varying pressure;
   a first flexible member positioned adjacent said common pressure chamber such that at least a portion of said first flexible member moves in response to variations in said variable pressure and said portion further moves in a first direction in response to a vibrational or gravitational force;
   a first fixed member positioned relative to said first flexible member such that said first fixed member and said first flexible member form a first capacitive sensor which produces a first signal responsive to said movement of said first flexible member, and where movement of said first flexible member in said first direction produces a positive change in said first signal;
   a second flexible member positioned adjacent said common pressure chamber such that at least a portion of said second flexible member moves in response to variations in said variable pressure and said portion further moves in said first direction in response to said vibrational or gravitational force; and
   a second fixed member positioned relative to said second flexible member such that said second fixed member and said second flexible member form a second capacitive sensor which produces a second signal responsive to said movement in said second flexible member and where movement of said second flexible member in said first direction produces a negative change in said second signal,
   wherein said first and second capacitive sensors are physically uncoupled to operate independently of each other in the presence of movement, said first and second signals from said first and second capacitive sensors being combined to provide a pressure measurement signal having a sensitivity at least as low as 1 micro-torr.

2. The sensor of claim 1, wherein said first and said second sensors comprise capacitance manometers having a sensitivity of approximately 10 micro-torr.

3. The sensor of claim 2, further comprising an electrical circuit, receiving said first and second signals, configured to produce a pressure signal indicative of said variable pressure based on said first and second signals.

4. The sensor of claim 1, wherein said first and second flexible members respectively form an gas-tight barrier between said common pressure chamber and a first and a second reference pressure chamber.

5. The sensor of claim 4, wherein said first and said second reference chambers receive a first and second reference pressure respectively, and said first flexible member moves in response to a variation between said first reference pressure and said varying pressure and said second flexible member moves in response to a variation between said second reference pressure and said varying pressure.

6. The sensor of claim 5, wherein said first and second reference pressures are identical.

7. The sensor of claim 6, wherein each of said first and second flexible members and each of said first and second fixed members are centered about a common axis and said first and second flexible members are respectively interposed between said first and second fixed members and said common pressure chamber.

8. The sensor of claim 7, wherein said vibrational or gravitational force causes said first flexible member to move a first distance away from said first fixed member and said vibrational or gravitational force further causes said second flexible member to move a second distance toward said second fixed member.

9. The sensor of claim 8, wherein movement of said first flexible member away from said and second flexible diaphragm produce an opposite change in said first and second signals produced by said first and second sensors.

10. The sensor of claim 1, wherein said sensor is positioned within an oven configured to maintain said sensor at a constant temperature to thereby minimize the effects of condensation on said sensor.

11. A capacitive pressure sensor comprising:
   a common source of an unknown pressure;
   a first capacitance manometer that receives said unknown pressure to produce a first signal indicative of said unknown pressure, said first capacitance manometer positioned in a first location where a vibrational or gravitational force applied to said sensor causes a positive change in said first signal; and
   a second capacitance manometer that receives said unknown pressure to produce a second signal indicative of said unknown pressure, said second capacitance manometer positioned in a second location where a vibrational or gravitational force applied to said sensor causes a negative change in said second signal,
   said first and second signals combined to provide a pressure measurement responsive to a difference between said first and second signals, said pressure measurement sensitive to changes in said unknown pressure of at least as low as 1 micro-torr.

12. The sensor of claim 11, further comprising an electrical circuit receiving said first and second signals configured to produce a pressure signal indicative of said unknown pressure, wherein said pressure signal is unaffected by said positive and negative changes in said first and second signals respectively resulting from said vibrational or gravitational force.

13. The sensor of claim 12, wherein said electrical circuit includes an adjustable component which permits said electrical circuit to be trimmed to thereby eliminate changes in said pressure signal resulting from said vibrational or gravitational force.

14. The sensor of claim 13, wherein said adjustable components weights said first and second signals and said circuit then sums said weighted first and second signals so that said positive change in said first signal due to said gravitational force is substantially canceled by said corresponding negative change in said second signal thereby producing said pressure signal which is substantially unaffected by said vibrational or gravitational force.

15. The sensor of claim 14, wherein said first and second capacitance manometers have sensitivities on the range of 10 micro-torr.

16. The sensor of claim 15, wherein said first and second capacitance manometers each respectively include a first and second flexible diaphragm forming a first and second variable electrode which move in response to said unknown pressure, and a first and second fixed member forming a first and second fixed electrode, wherein said first signal is a capacitance signal measured between said first fixed and variable electrodes and said second signal is a capacitance signal measured between said second fixed and variable electrodes.

17. The sensor of claim 16, wherein said first and second capacitance manometers are positioned relative to each other such that a change in said unknown pressure causes a portion of said first flexible diaphragm to move closer to said first fixed member, and said change in said unknown pressure causes a portion of said second flexible diaphragm to move closer to said second fixed member.

18. The sensor of claim 17, wherein said first and second capacitance manometers are positioned relative to each other such that said vibrational or gravitational force causes a portion of said first flexible member to move away from said first fixed member and said vibrational or gravitational force causes a portion of said second flexible member to move towards said second fixed member.

19. A capacitive pressure sensor comprising:
   means for providing an unknown pressure to a common pressure chamber;
   first capacitive measurement device that receives said unknown pressure and that produces a first signal indicative of said unknown pressure, said first measurement device positioned so that application of a vibrational or gravitational force to said pressure sensor produces a first change in said first signal;
   second capacitive measurement device uncoupled from said first capacitive measurement device and that operates independently to receive said unknown pressure and to produce a second signal indicative of said unknown pressure, said second measurement device positioned so that application of said vibrational or gravitational force to said pressure sensor produces a second change in said second signal, and
   a circuit that receives and combines said first and second signals from said first and second capacitive measurement devices to generate a sensor output signal responsive to said unknown pressure, said circuit combining said first and second signals such that changes in said first and second signals caused by vibrational or gravitational forces cancel, said sensor output signal having a sensitivity to said unknown pressure to changes at least as small as 1 micro-torr.

20. The sensor of claim 19, further comprising an electrical measurement means for receiving said first and second signals and for producing a pressure signal indicative of said unknown pressure such that said pressure signal is unaffected by said first change in said first signal or said second change in said second signal.

21. The sensor of claim 20, wherein said electrical measurement means further includes an adjustable component which permits said electrical measurement means to be adjusted to produce said pressure signal.

22. The sensor of claim 20, wherein each of said first measurement means and said second measurement means comprises:
   a flexible member, at least a portion of which moves in response to changes in said unknown pressure; and
   a fixed member positioned relative to said flexible member to form a capacitance manometer.

23. The sensor of claim 22, wherein said portion of said flexible member moves away from said fixed member in response to a change in said unknown pressure.

24. The sensor of claim 23, wherein said portion of said flexible member of said first measurement means moves towards said respective fixed member when said vibrational or gravitational force is applied to said sensor, and said portions of said flexible member of said second measurement means moves away from said respective fixed member when said vibrational or gravitational force is applied to said sensor.

25. The sensor of claim 19, wherein said sensor is positioned within an oven configured to maintain said sensor at a constant temperature to thereby minimize the effects of condensation on said sensor.

26. A method of measuring an unknown pressure in the presence of vibrational or gravitational forces, comprising the steps of:
   providing said unknown pressure to first and second capacitance manometers, each of said capacitance manometers having a sensitivity sufficient to be affected by a vibrational or gravitational force such that measurements of very low pressures are distorted by said vibrational or gravitational force;
   producing a first signal indicative of said unknown pressure from said first capacitance manometer;
   producing a second signal indicative of said unknown pressure from said second capacitance manometer;
   positioning said first and second capacitance manometers with respect to each other so that said vibrational or gravitational force produces a first change in said first signal produced by said first capacitance manometer and said vibrational or gravitational force produces a second change in said second signal produced by said second capacitance manometer, said capacitance manometers selected so that said first change and said second change are substantially similar in magnitude and opposite in sign; and
   combining said first and second signals to provide a third signal, wherein said third signal is unaffected by either said first or second changes in the signals respectively produced by said first and second capacitance manometers such that said third signal provides an accurate indication of said unknown pressure with a sensitivity as low as at least 1 micro-torr.

27. A pressure sensor comprising:
   a common pressure chamber receiving a varying pressure;
   a first flexible member positioned adjacent said common pressure chamber such that at least a portion of said first flexible member moves in response to variations in said variable pressure and said portion further moves in a first direction in response to a vibrational or gravitational force;
   a first fixed member positioned relative to said first flexible member such that said first fixed member and said first flexible member form a first sensor which produces a first signal responsive to said movement of said first flexible member, and where movement of said first flexible member in said first direction produces a positive change in said first signal;
   a second flexible member positioned adjacent said common pressure chamber such that at least a portion of said second flexible member moves in response to variations in said variable pressure and said portion further moves in said first direction in response to said vibrational or gravitational force;
   a second fixed member positioned relative to said second flexible member such that said second fixed member and said second flexible member form a second sensor which produces a second signal responsive to said movement in said second flexible member and where movement of said second flexible member in said first direction produces a negative change in said second signal; and
   a component adjustable after the manufacture of said pressure sensor which applies an adjustable linearly-variable weight to and adds together each of said first and second signals, so that said first and second signals, when weighted by said component after adjustment, sum to a value approximately equal to zero in response to movement of said flexible members induced by vibrational and gravitational forces.

28. A pressure sensor comprising:
   a common source of an unknown pressure;
   a thermostatically-controlled oven, said oven maintaining said pressure sensor at a constant temperature, thereby minimizing changes in the operation of said pressure sensor caused by thermal expansion or contraction of the materials comprising said pressure sensor and thereby minimizing condensation within said pressure sensor;
   a first capacitance manometer that receives said unknown pressure to produce a first signal indicative of said unknown pressure, said first capacitance manometer positioned in a first location where a vibrational or gravitational force applied to said sensor causes a positive change in said first signal; and
   a second capacitance manometer that receives said unknown pressure to produce a second signal indicative of said unknown pressure, said second capacitance manometer positioned in a second location where a vibrational or gravitational force applied to said sensor causes a negative change in said second signal.

29. A pressure sensor comprising:
   a common pressure chamber;
   an inlet that communicates an unknown pressure to said common pressure chamber;
   a first measuring device that receives said unknown pressure and that produces a first signal indicative of said unknown pressure, said first measuring device positioned so that application of a vibrational or gravitational force to said pressure sensor produces a first change in said first signal;
   a second measuring device that receives said unknown pressure and that produces a second signal indicative of said unknown pressure, said second measuring device positioned so that application of said vibrational or gravitational force to said pressure sensor produces a second change in said second signal;

an electrical circuit capable of adjustment after the manufacture of said pressure sensor which applies a linearly-variable weight factor to each of said first and second signals and sums the weighted first and second signals, said weight factor chosen to cancel the dependence of the pressure reading of said pressure sensor on vibrational motion and gravitational forces; and a thermostatically-controlled oven, said oven maintaining said pressure sensor at a constant temperature to minimize the effects of thermal expansion and contraction on said pressure sensor and to minimize the effects on said pressure sensor of condensation.

* * * * *